March 27, 1962 G. N. CHATHAM ETAL 3,026,906
DIVERTING VALVE WITH SEATS OF DIFFERENT SIZES
Filed July 18, 1961 2 Sheets-Sheet 1
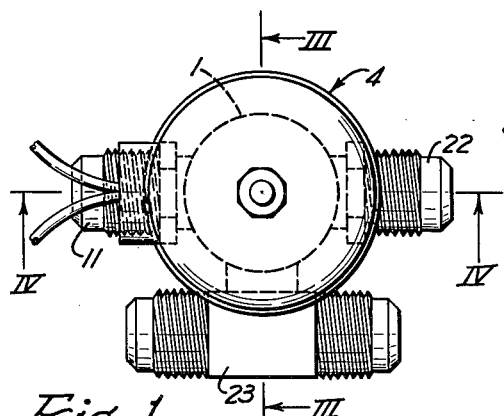
Fig. 1
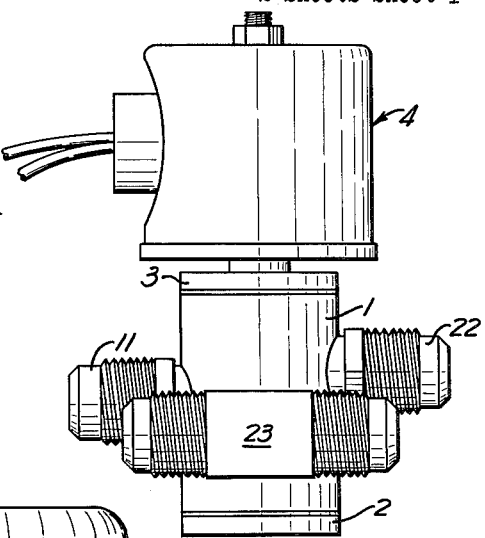
Fig. 2
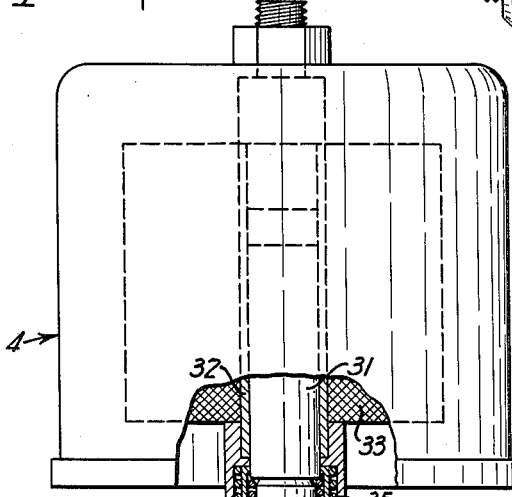
Fig. 3
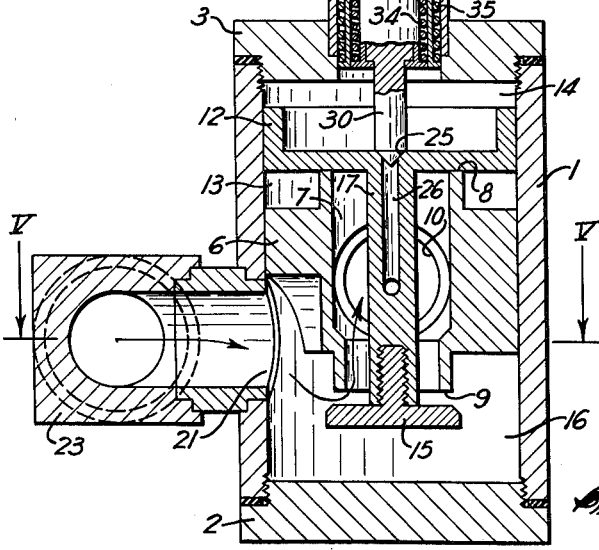
INVENTORS
GEORGE N. CHATHAM
O O SHURTLEFF
BY
Brown, Critchlow, Flick &
Peckham
ATTORNEYS March 27, 1962  G. N. CHATHAM ETAL  3,026,906
DIVERTING VALVE WITH SEATS OF DIFFERENT SIZES
Filed July 18, 1961  2 Sheets-Sheet 2
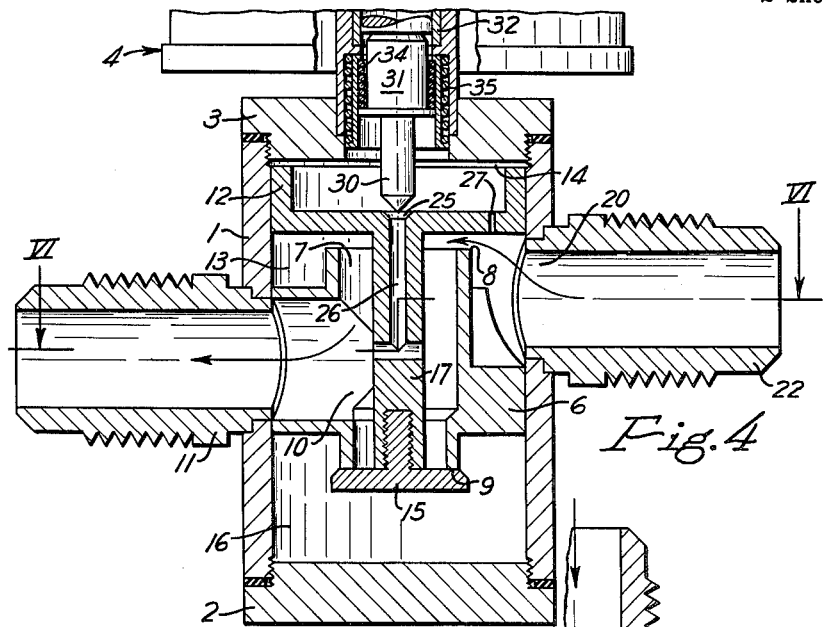
Fig.4
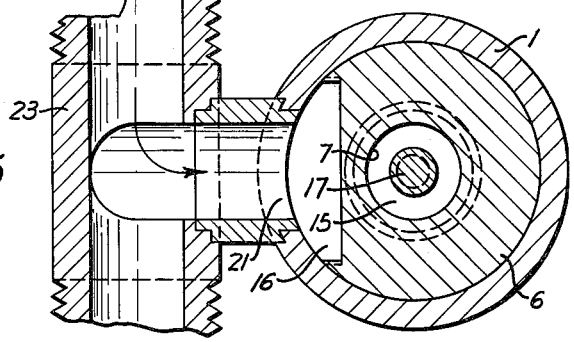
Fig.5
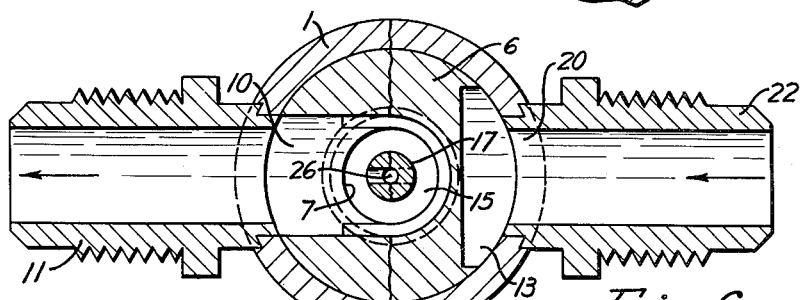
Fig.6
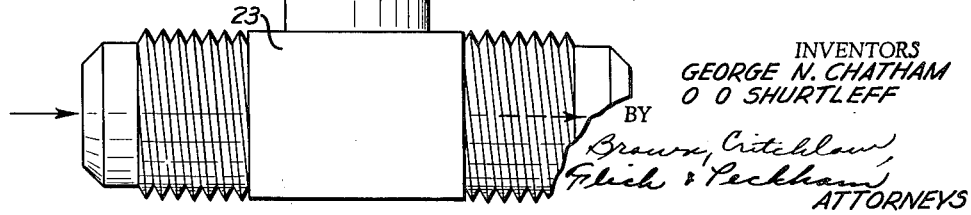
INVENTORS
GEORGE N. CHATHAM
O. O. SHURTLEFF
BY
ATTORNEYS

United States Patent Office 3,026,906
Patented Mar. 27, 1962

3,026,906
DIVERTING VALVE WITH SEATS OF DIFFERENT SIZES
George N. Chatham and O O Shurtleff, Austin, Tex., assignors to Chatleff Controls, Inc., Austin, Tex., a corporation of Texas
Filed July 18, 1961, Ser. No. 126,833
3 Claims. (Cl. 137—625.4)

This invention relates to valves used for diverting fluid from one passage to another.

It is among the objects of this invention to provide a valve for directing fluid through either one of two fluid circuits, in which the transfer from either circuit to the other is made gradually without any interruption of flow, in which the rate of movement of the valve during the transfer is controlled by the rate of fluid movement into and out of it, and which is quiet and positive in operation.

In accordance with this invention a valve housing contains a pair of spaced end chambers connected by a central passage of smaller diameter that is provided with a lateral outlet port. Each end of the passage has a valve seat in the surrounding chamber but one seat is smaller than the other. Fluid pressure responsive means is mounted in the chamber containing the larger seat for movement toward and away from the seat to close and open the corresponding end of the central passage. The pressure responsive means, which is provided with a central opening, separates the surrounding chamber into inner and outer sections. The valve has a by-pass permanently connecting the inner and outer chamber sections. Disposed in the other end chamber is a closure disc that is adapted to engage the smaller seat. A stem extends through the central passage and is connected to the central portions of the pressure responsive means and closure disc and spaces them farther apart than the valve seats. The stem has an opening through it connecting the central opening in the pressure responsive means with the central passage. The valve housing has two inlet ports, one of which opens into the inner chamber section and the other of which opens into the other end chamber. In the outer chamber section there is a movable closure member for the central opening in the pressure responsive means, to permit the latter to engage the adjacent valve seat. Provision is made for moving the closure member away from the central opening when desired so that the closure disc will engage its seat.

The invention is illustrated in the accompanying drawings, in which:

FIG. 1 is a plan view of our valve;
FIG. 2 is a side view;
FIG. 3 is an enlarged vertical section, taken on the line III—III of FIG. 1;
FIG. 4 is an enlarged fragmentary vertical section, taken on the line IV—IV of FIG. 1 at 90° to FIG. 3;
FIG. 5 is a horizontal section, taken on the line V—V of FIG. 3; and
FIG. 6 is a horizontal section, taken on the line VI—VI of FIG. 4.

Referring to the drawings, in which the valve is shown vertical for convenience of description, a vertical cylinder 1 is closed at its lower end by a bottom cap 2, and is closed at its upper end by a top cap 3 and the lower part of a solenoid mechanism 4. The inside of the housing thus formed is separated into upper and lower end chambers by means of a central partition member 6 fitting tightly in the housing and through which extends a vertical passage 7 that connects the upper and lower chambers. The passage is considerably smaller in diameter than the chambers, and the side wall of the passage projects a short distance above and below the partition to form circular valve seats 8 and 9 spaced from the side walls of the chambers. The lower end of the passage and the surrounding seat 9 are smaller than the upper end and seat 8. Midway between its ends, the passage is provided with an outlet port 10 that extends outward through the partition and the cylinder as shown in FIG. 4. The port communicates with a hollow fitting 11.

Disposed in the upper and lower chambers of the valve housing are fluid pressure responsive means, the upper one of which may include a flexible diaphragm or piston. A piston 12 is illustrated and preferably is cup-shape. The piston separates the upper end chamber into inner and outer sections 13 and 14. The lower fluid pressure responsive means is a closure disc 15 considerably smaller in diameter than the lower end chamber 16 so that the disc does not separate that chamber into two sections. The piston and disc are rigidly connected by a stem 17 that is longer than passage 7 so that only one end of the passage can be closed.

The valve housing is provided with an inlet port 20 (FIG. 4) that opens into the upper inner chamber section 13, and with another inlet port 21 (FIG. 3) that opens into the lower end chamber 16. A tubular fitting 22 is connected with port 20. Preferably a T-fitting 23 is connected to the lower inlet port, although the same result could be obtained by providing the lower part of the valve housing with an outlet from the lower end chamber. To permit the housing to be made as short as possible, parts of partition member 6 at the inner ends of the inlet ports are cut away so that the ports can overlap that member without being obstructed by it.

When a valve seat 8 or 9 is engaged by the adjacent closure means, that end of passage 7 is closed. Piston 12 has a central opening 25 through it, which opens into an opening 26 through stem 17 leading into the central part of passage 7. The piston also has a by-pass hole 27 through it outside of 8, for permanently connecting inner and outer chamber sections 13 and 14 as will be explained presently. The same result could be obtained by substituting, for the by-pass hole, clearance between the piston and side of the housing.

In the upper outer chamber section 14 there is a valve member, preferably a plunger 30, for closing the central opening 25 through piston 12. The plunger is connected to a solenoid core 31 slidably mounted in a sealed tube 32 sealed in cap 3 and encircled by an electric coil 33. The core is urged toward the opposite end of the valve housing by coil springs 34 and 35 encircling the lower end of the core.

The normal position of the valve, in which solenoid coil 33 is not energized, is shown in FIGS. 3 and 6. In that position plunger 30 closes the central opening 25 through the piston, so the high fluid pressure entering upper chamber section 14 above the piston through by-pass 27 holds the piston on seat 8 because the fluid pressure beneath the piston is less in passage 7, due to outlet 10 being the lowest pressure point in the valve. At the same time, stem 17 holds closure disc 15 down away from seat 9, whereby lower end chamber 16 is in communication with the inside of passage 7 and the lower pressure in outlet port 10. At this time the fluid therefore enters one end of the T-fitting 23 and is diverted through lower inlet port 21 into lower chamber 16, and then up into central passage 7 and out through outlet port 10. The circuit from the other end of the T-fitting through elements (not shown) outside of the valve and back to inlet port 20 is shut off by piston 12 at seat 8.

When the solenoid coil is energized, core 31 is drawn upward to remove plunger 30 from central opening 25 in the piston, as shown in FIG. 4. With the opening of upper chamber section 14 in this manner, the pressure above the piston is reduced through stem opening 26 to substantially that of outlet port 10. At the same time the high pressure in chamber section 13 raises the piston to the top of the housing. The raising of stem 17 in this manner lifts closure disc 15 to its seat 9 to close the lower end of passage 7, and the pressure difference across the disc helps to hold it closed. Fluid therefore can no longer enter the valve housing through lower inlet 21 to be short-circuited through the valve, so it flows straight through the T-fitting as shown in FIG. 6 and around to upper inlet port 20, and then down through the center passage to outlet port 10.

When the coil is de-energized again, gravity, or springs 34 and 35, will cause plunger 30 to close the central opening through the piston. Since the fluid flowing from the larger chamber 13 into the smaller passage 7 is accelerated as it flows over seat 8 and therefore is reduced in pressure, the pressure against the area of piston 12 directly above the seat and passage is likewise reduced. By doubling the velocity of the fluid entering the central passage the pressure differential across the piston can be made so large that the weight of the movable element becomes inconsequential. Because this pressure differential is greater than the pressure differential across closure disc 15 against the smaller seat 9, the piston can move toward seat 8 and push the disc away from the other seat.

The difference in areas between seats 8 and 9 represents the force available to shift the valve. By controlling this area difference, the suddenness of the shift can be controlled. Generally, the area difference will be made such that at the minimum flow for which a particular valve is designed, a force differential will be generated equal to approximately double the weight of the movable element so that the valve can be installed in any position, even inverted.

The by-pass hole 27 through the piston is large enough to permit the piston to move at the desired speed, but not so large that it would short-circuit the pressure imbalance created across the piston at the moment of opening its center hole 25, because in that case the piston would not move. The valve changes gradually from one position to the other without any flow interruption to cause water hammer, so quiet and positive operation are easily achieved. One circuit opens gradually at the same rate that the other is closed. The valve is very compact, as all moving parts are concentric with one another.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A diverting valve comprising a housing containing a pair of spaced end chambers connected by a central passage of smaller diameter provided with a lateral outlet port, each end of said passage having a valve seat in the surrounding chamber, one seat having a smaller diameter than the other, fluid pressure responsive means mounted in the chamber containing the larger seat for movement toward and away from that seat to close and open the corresponding end of said passage, said means separating said chamber into inner and outer sections and being provided with a central opening, the valve having a by-pass permanently connecting said inner and outer chamber sections, a closure disc disposed in the other end chamber adapted to engage the smaller seat, a stem extending through said passage and connected to the central portions of said pressure responsive means and closure disc and spacing them farther apart than said seats, said stem having an opening therethrough connecting said central opening with said central passage, said housing having inlet ports opening into said inner chamber section and said other end chamber, a movable closure member in said outer chamber section for the central opening in said pressure responsive means, and means for moving said closure member away from said central opening to open it.

2. A diverting valve according to claim 1, in which said by-pass is an opening through said pressure responsive means outside of said larger valve seat.

3. A diverting valve according to claim 1, in which said pressure responsive means is a piston slidably mounted in the surrounding end chamber.

References Cited in the file of this patent
UNITED STATES PATENTS

| | | |
|---|---|---|
| 2,319,578 | Beekley | May 18, 1943 |
| 2,329,001 | Robinson | Sept. 7, 1943 |

FOREIGN PATENTS

| | | |
|---|---|---|
| 831,787 | Germany | Feb. 18, 1952 |